US007459484B2

(12) United States Patent
Blanchard et al.

(10) Patent No.: US 7,459,484 B2
(45) Date of Patent: Dec. 2, 2008

(54) ORGANIC COLLOIDAL DISPERSION OF IRON PARTICLES, METHOD FOR PREPARING SAME AND USE THEREOF AS FUEL ADDITIVE FOR INTERNAL COMBUSTION ENGINES

(75) Inventors: Gilbert Blanchard, Lagny-le-Sec (FR); Jean-Yves Chane-Ching, Lacroix-Salgarde (FR); Bruno Tolla, Naperville, IL (US)

(73) Assignee: Rhodia Electronics and Catalysis, La Rochelle (FR)

( * ) Notice: Subject to any disclaimer, the term of this patent is extended or adjusted under 35 U.S.C. 154(b) by 302 days.

(21) Appl. No.: 10/499,559

(22) PCT Filed: Dec. 19, 2002

(86) PCT No.: PCT/FR02/04453

§ 371 (c)(1),
(2), (4) Date: Oct. 22, 2004

(87) PCT Pub. No.: WO03/053560

PCT Pub. Date: Jul. 3, 2003

(65) Prior Publication Data

US 2005/0039382 A1 Feb. 24, 2005

(30) Foreign Application Priority Data

Dec. 21, 2001 (FR) .................................. 01 16710

(51) Int. Cl.
*B01F 3/12* (2006.01)
*B01F 17/10* (2006.01)
(52) U.S. Cl. ..................... 516/33; 516/198; 516/204; 516/922

(58) Field of Classification Search ................ 516/33, 516/198, 204, 922
See application file for complete search history.

(56) References Cited

U.S. PATENT DOCUMENTS

| 6,136,048 A | * | 10/2000 | Birchem et al. | ............... 44/354 |
| 6,271,269 B1 | * | 8/2001 | Chane-Ching et al. | ......... 516/33 |
| 6,811,723 B1 | * | 11/2004 | Aupaix et al. | ............. 252/363.5 |
| 2003/0187077 A1 | * | 10/2003 | Chane-Ching | ............... 516/31 |

FOREIGN PATENT DOCUMENTS

| JP | 51-122107 | * | 10/1976 |
| JP | 62-167393 | * | 7/1987 |
| JP | 64-83522 | | 3/1989 |
| JP | 6-122519 | | 5/1994 |
| SU | 414197 | | 2/1974 |
| WO | WO 00/49099 | * | 8/2000 |
| WO | WO0194262 A | * | 12/2001 |

* cited by examiner

*Primary Examiner*—Timothy J Kugel
(74) *Attorney, Agent, or Firm*—Buchanan, Ingersoll & Rooney, PC

(57) ABSTRACT

The colloidal dispersion of the invention is characterized in that it comprises an organic phase; particles of an iron compound in its amorphous form; and at least one amphiphilic agent. It is prepared by a process in which either an iron salt in the presence of an iron complexing agent or an iron complex is reacted with a base, maintaining the pH of the reaction medium at a value of at most 8 to obtain a precipitate, the iron complexing agent being selected from hydrosoluble carboxylic acids with a complexing constant K such that the pK is at least 3 and the iron complex being selected from the products of reacting iron salts with said acids; then the precipitate obtained or a suspension containing said precipitate is brought into contact with an organic phase in the presence of an amphiphilic agent to obtain the dispersion in an organic phase. The dispersion of the invention can be used as a combustion additive in liquid fuel or motor fuel.

16 Claims, No Drawings

ORGANIC COLLOIDAL DISPERSION OF IRON PARTICLES, METHOD FOR PREPARING SAME AND USE THEREOF AS FUEL ADDITIVE FOR INTERNAL COMBUSTION ENGINES This application is an application under 35 U.S.C. Section 371 of International Application Number PCT/FR02/04453 filed on Dec. 19, 2002.

The present invention relates to an organic colloidal dispersion of iron particles, to a process for its preparation, and to its use as a fuel additive for internal combustion engines.

During combustion of gas oil in the diesel engine, carbonaceous products are known to tend to form soot, which is known to be noxious both to the environment and to health. Techniques for reducing the emission of such carbonaceous particles, hereinafter termed "soot", have long been investigated.

One satisfactory solution consists of introducing catalysts into the soot to allow frequent self-ignition of the soot collected on a filter. To this end, the soot has to have a sufficiently low self-ignition temperature that is frequently attained during normal operation of the engine.

It is known that dispersions of rare earth or iron compositions used as an additive can contribute to reducing the soot self-ignition temperature.

Such colloidal dispersions should have good dispersibility in the medium into which they are introduced, high stability over time and sufficient catalytic activity at a relatively low concentration.

Known colloidal dispersions do not always satisfy all of those criteria. They may, for example, have good dispersibility but not sufficient stability, or good stability but a catalytic activity that requires concentrations that are too high to be of economic interest.

Further, they may have complex preparation processes. As an example, such dispersions are dispersions of particles in an organic phase and they are generally obtained by transferring a starting dispersion in an aqueous phase into the final organic phase. Such a transfer can be difficult to carry out.

The invention aims to provide a colloidal dispersion with improved properties the preparation of which is easier to carry out.

To this end, in a first aspect, the colloidal dispersion of the invention is characterized in that it comprises:
an organic phase;
particles of an iron compound in its amorphous form;
at least one amphiphilic agent.

In accordance with a second implementation of the invention, the invention also concerns a colloidal dispersion which is characterized in that it comprises:
an organic phase;
particles of an iron compound in its amorphous form;
particles of a rare earth compound;
at least one amphiphilic agent.

The invention also concerns a process for preparing the dispersion in accordance with said first implementation which is characterized in that it comprises the following steps:
reacting either an iron salt in the presence of an iron complexing agent or an iron complex with a base, maintaining the pH of the reaction medium at a value of at most 8 to obtain a precipitate, the iron complexing agent being selected from hydrosoluble carboxylic acids with a complexing constant K such that the pK is at least 3 and the iron complex being selected from the products of reacting iron salts with said acids;

bringing the precipitate obtained or a suspension containing said precipitate into contact with an organic phase in the presence of an amphiphilic agent to obtain the dispersion in an organic phase.

The dispersion of the invention has the advantage of being very stable. It also has high activity. The process for preparing the dispersion of the first implementation allows effective transfer of the aqueous phase to the organic phase.

Further characteristics, details and advantages of the invention will become clearer from the following description, examples and figures intended to illustrate it.

In the present description, the expression "colloidal dispersion" designates any system constituted by fine solid particles of an iron compound or a rare earth compound, with colloidal dimensions, in suspension in a liquid phase, said particles possibly also containing residual quantities of bound or adsorbed ions such as acetate or ammonium ions, for example. It should be noted that in such a dispersion, the iron or rare earth can be either completely in the form of colloids or simultaneously in the form of ions and in the form of colloids.

The dispersion of the first implementation of the invention will now be described.

The dispersion of the invention is a dispersion in an organic phase.

This organic phase is selected as a function of the use of the dispersion.

The organic phase can be based on an apolar hydrocarbon.

Examples of the organic phase which can be cited are aliphatic hydrocarbons such as hexane, heptane, octane or nonane, inert cycloaliphatic hydrocarbons such as cyclohexane, cyclopentane or cycloheptane, aromatic hydrocarbons such as benzene, toluene, ethylbenzene, xylenes or liquid naphthenes. ISOPAR or SOLVESSO (registered trade mark owned by EXXON) petroleum cuts, in particular SOLVESSO 100 which essentially contains a mixture of methylethyl- and trimethyl-benzene, SOLVESSO 150 which comprises a mixture of alkylbenzenes, in particular dimethylbenzene and tetramethylbenzene, and ISOPAR which essentially contains iso- and cycloparaffinic C-11 and C-12 hydrocarbons, are also suitable.

It is also possible to use chlorinated hydrocarbons as the organic phase such as chloro- or dichloro-benzene or chlorotoluene. Ethers and aliphatic and cycloaliphatic ketones such as diisopropyl ether, dibutyl ether, methylisobutylketone, diisobutylketone or mesityl oxide can be envisaged.

Clearly, the organic phase can be based on a mixture of two or more hydrocarbons of the type described above.

The particles of the dispersion of the invention are particles of an iron compound the composition of which essentially corresponds to an iron oxide and/or hydroxide and/or oxyhydroxide. The iron is generally essentially present in oxidation state 3. The particles also contain a complexing agent. The complexing agent corresponds to that which is used in the process for preparing the dispersion either per se or in the form of an iron complex.

The particles of the dispersion of the invention are based on an iron compound which is amorphous. This amorphous character can be demonstrated by X ray analysis, as the X ray diagrams obtained do not show any significant peaks.

In accordance with one characteristic of the invention, at least 85%, more particularly at least 90% and still more particularly at least 95% of the particles are primary particles. The term "primary particle" means a particle which is completely discrete and which is not aggregated with another or several other particles. This characteristic can be demonstrated by examining the dispersion using TEM (high resolution transmission electron microscopy).

It is also possible to use the cryo-TEM technique to determine the degree of aggregation of elementary particles. It allows transmission electron microscopic (TEM) examination of samples that are frozen in their natural medium which is either water or organic diluents such as aromatic or aliphatic solvents, for example SOLVESSO and ISOPAR, or certain alcohols such as ethanol.

Freezing is carried out on thin films about 50 nm to 100 nm in thickness, either in liquid ethane for aqueous samples or in liquid nitrogen for others.

The cryo-TEM preserves the degree of dispersion of the particles and is representative of that present in the actual medium.

This characteristic of the particles of the dispersion contributes to its stability.

Further, the particles in the dispersion of the invention have a fine granulometry. They have a $d_{50}$ in the range 1 nm to 5 nm, more particularly in the range 3 nm to 4 nm.

The granulometry is determined by transmission electron microscopy (TEM) in conventional manner using a sample that has been dried on a carbon membrane supported on a copper grid.

This technique for preparing the sample is preferred as it allows better accuracy in the particle size measurement. The zones selected for the measurements are those which have a degree of dispersion similar to that observed in cryo-TEM.

The particles of the dispersion of the invention can have an isotropic morphology, in particular with a ratio L (largest dimension)/l (smallest dimension) of at most 2.

The organic colloidal dispersion of the invention comprises at least one amphiphilic agent with the organic phase.

This amphiphilic agent can be a carboxylic acid which generally contains 10 to 50 carbon atoms, preferably 15 to 25 carbon atoms.

Said acid may be linear or branched. It can be selected from aryl, aliphatic or arylaliphatic acids, optionally carrying other functions provided that those functions are stable in the media in which the dispersions of the invention are to be used. Thus, for example, it is possible to use aliphatic carboxylic acids, aliphatic sulphonic acids, aliphatic phoshonic acids, alkylarylsulphonic acids and alkylarylphosphonic acids, whether natural or synthetic. Clearly, it is possible to use a mixture of acids.

Examples that can be cited include fatty acids of tall oil, soya oil, tallow, linseed oil, oleic acid, linoleic acid, stearic acid and their isomers, pelargonic acid, capric acid, lauric acid, myristic acid, dodecylbenzenesulphonic acid, 2-ethylhexanoic acid, naphthenic acid, hexoic acid, toluenesulphonic acid, toluenephosphonic acid, laurylsulphonic acid, laurylphosphonic acid, palmitylsulphonic acid and palmitylphosphonic acid.

Within the context of the present invention, the amphiphilic agent can also be selected from polyoxyethylenated alkyl ether phosphates. This means phosphates with formula:

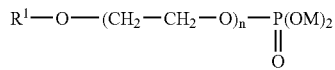

or polyoxyethylenated dialkyl phosphates with formula:

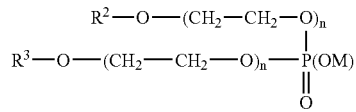

in which formulae:

$R^1$, $R^2$ and $R^3$, which may be identical or different, represent a linear or branched alkyl radical, in particular containing 2 to 20 carbon atoms; a phenyl radical; an alkylaryl radical, more particularly an alkylphenyl radical, in particular with an alkyl chain containing 8 to 12 carbon atoms; or an arylalkyl radical, more particularly a phenylaryl radical;

n represents the number of ethylene oxide units, which can be from 0 to 12, for example;

M represents a hydrogen, sodium or potassium atom.

In particular, $R_1$ can be a hexyl, octyl, decyl, dodecyl, oleyl or nonylphenyl radical.

Examples of this type of amphiphilic compounds that can be cited are those sold under the trade marks LUBROPHOS® and RHODAFAC® by Rhodia and in particular the following products:

RHODAFAC® RA polyoxyethylene (C8-C10)alkylether phosphates;

RHODAFAC® RS710 or RS 410 polyoxyethylene tridecyl ether phosphate;

RHODAFAC® PA 35 polyoxyethylene oleodecyl ether phosphate;

RHODAFAC® PA17 polyoxyethylene nonylphenyl ether phosphate;

RHODAFAC® RE610 polyoxyethylene (branched)nonyl ether phosphate.

Finally, the amphiphilic agent can be a polyoxyethylenated alkyl ether carboxylate with formula: $R^4$—$(OC_2H_4)_n$—O—$R^5$, in which $R^4$ is a linear or branched alkyl radical which can in particular contain 4 to 20 carbon atoms, n is a whole number which can, for example, be up to 12 and $R^5$ is a carboxylic acid residue such as —$CH_2COOH$. Examples of this type of amphiphilic compound that can be mentioned are those sold by Kao Chemicals under the trade mark AKIPO®.

The dispersions of the invention have an iron compound concentration which can be at least 8%, more particularly at least 15% and still more particularly at least 30%, this concentration being expressed as the equivalent weight of iron III oxide with respect to the total dispersion weight. This concentration can be up to 40%.

The dispersions of the invention have excellent stability. No decantation is observed after several months.

As indicated above, in a second implementation, the invention also concerns a dispersion in an organic phase of particles of an iron compound in its amorphous form and particles of a rare earth compound, as a mixture in an organic phase the dispersion further comprising an amphiphilic agent.

The above description concerning the first implementation of the invention and concerning the nature of the organic phase and the amphiphilic agent is also relevant here.

Further, the rare earth in the rare earth compound can be selected from cerium, lanthanum, yttrium, neodymium, gadolinium and praseodymium. More particularly, cerium can be selected.

The particles of the rare earth compound can optionally have the same characteristics as those given above for the iron compound, in particular as regards their dimensions or morphology. They could thus have a $d_{50}$ of the same value as that given above and also be primary particles, as indicated above.

The proportion of iron compound and rare earth compound can vary widely. However, the mole ratio of the iron compound/rare earth compound is generally in the range 0.5 to 1.5, and more particularly it can be equal to 1.

The rare earth compound can be a rare earth oxide and/or hydroxide and/or oxyhydroxide. Said compound can also be an organometallic compound.

The process for preparing the dispersions of the invention in accordance with the first implementation of the invention will now be described.

The first step of the process consists of reacting either an iron salt in the presence of a complexing agent or an iron complex with a base. This reaction is carried out in an aqueous medium.

Particular examples of the base can be hydroxide type products. Alkali or alkaline-earth hydroxides and ammonia can be cited. It is also possible to use secondary, tertiary or quaternary amines. However, amines and ammonia may be preferred provided that they reduce the risk of pollution by alkali or alkaline-earth cations. Urea can also be mentioned.

Any water-soluble salt can be used as the iron salt. More particularly, ferric nitrate can be mentioned.

In accordance with a specific characteristic of the process of the invention, the iron salt is reacted with the base in the presence of an iron complexing agent.

The iron complexing agents are selected from hydrosoluble carboxylic acids with a complexing constant K such that the pK is at least 3. For the reaction:

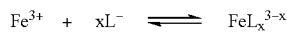

$$Fe^{3+} + xL^- \rightleftharpoons FeL_x^{3-x}$$

in which L designates the complexing agent, the constant K is defined as follows:

$K = FeL_x^{3-x}/[Fe^{3+}].[L^-]^x$ and $pK = \log(1/k)$

Acids having the above characteristics which can be mentioned are aliphatic carboxylic acids such as formic acid or acetic acid. Acid-alcohols or polyacid-alcohols are also suitable. Examples of acid-alcohols that can be cited are glycolic acid and lactic acid. Polyacid-alcohols that can be mentioned are malic acid, tartaric acid and citric acid.

Other suitable acids that can be cited are amino acids such as lysine, alanine, serine, glycine, aspartic acid or arginine. It is also possible to mention ethylene-diamine-tetraacetic acid or nitrilo-triacetic acid or N, N-diacetic glutamic acid with formula $(HCOO^-)CH_2CH_2—CH(COOH)N(CH_2COO^-H)_2$ or its sodium salt $(NaCOO^-)CH_2CH_2—CH(COONa)N(CH_2COO^-Na)_2$.

Other suitable complexing agents that can be used are polyacrylic acids and their salts such as sodium polyacrylate, and more particularly those the mass average molecular mass of which is in the range 2000 to 5000.

Finally, it should be noted that a plurality of complexing agents can be used conjointly.

As indicated above, the reaction with the base can also be carried out with an iron complex. In this case, the iron complex used is a product resulting from complexing iron with a complexing agent of the type described above. This product can be obtained by reacting an iron salt with said complexing agent.

The quantity of complexing agent used, expressed as the mole ratio of complexing agent/iron, is preferably in the range 0.5 to 4, more particularly in the range 0.5 to 1.5 and still more particularly in the range 0.8 to 1.2.

The reaction between the iron salt and the base is carried out under conditions such that the pH of the reaction mixture which is formed is at most 8. More particularly, this pH can be at most 7.5 and it can in particular be in the range 6.5 to 7.5.

The aqueous mixture and basic medium are brought into contact by introducing a solution of the iron salt into a solution containing the base. It is possible to carry out contact continuously, the pH condition being satisfied by adjusting the respective flow rates of the solution of iron salt and of the solution containing the base.

In a preferred implementation of the invention, it is possible to operate under conditions such that during the reaction between the iron salt and the base, the pH of the reaction medium formed is kept constant. The term "pH is kept constant" means a pH variation of ±0.2 pH units with respect to the fixed value. Such conditions can be achieved by adding an additional quantity of base to the reaction mixture formed during the reaction between the iron salt and the base, for example when introducing the iron salt solution to the solution of the base.

The reaction is normally carried out at ambient temperature. This reaction can advantageously be carried out in an atmosphere of air or nitrogen or a nitrogen-air mixture.

At the end of the reaction, a precipitate is obtained. Optionally, the precipitate can be matured by keeping it in the reaction medium for a certain period, for example several hours.

The precipitate can be separated from the reaction medium using any known means. The precipitate can be washed.

Preferably, the precipitate does not undergo a drying or freeze drying step or any operation of that type.

The precipitate can optionally be taken up in aqueous suspension.

However, it should be noted that it is entirely possible not to separate the precipitate from the reaction medium in which it has been produced To obtain a colloidal dispersion in an organic phase, either the separated precipitate or the aqueous suspension obtained above after separating the precipitate from the reaction medium, or the precipitate in suspension in its reaction medium is brought into contact with the organic phase in which the colloidal dispersion is to be produced. This organic phase is of the type described above.

This contact is brought about in the presence of said amphiphilic agent. The quantity of this amphiphilic agent to be incorporated can be defined by the mole ratio r:

$$r = \frac{\text{number of moles of amphiphilic agent}}{\text{number of moles of iron elements}}$$

This mole ratio can be in the range 0.2 to 1, preferably in the range 0.4 to 0.8.

The quantity of organic phase to be incorporated is adjusted to obtain a concentration of oxide as mentioned above.

At this stage, it may be advantageous to add to the organic phase a promoter agent the function of which is to accelerate transfer of particles of iron compound from the aqueous phase to the organic phase, if starting from a suspension of the precipitate, and to improve the stability of the organic colloidal dispersions obtained.

The promoter agent may be a compound with an alcohol function, more particularly linear or branched aliphatic alcohols containing 6 to 12 carbon atoms. Specific examples that can be mentioned are 2-ethylhexanol, decanol, dodecanol and mixtures thereof.

The proportion of said agent is not critical and can vary widely. However, a proportion in the range 2% to 15% by weight with respect to the whole dispersion is generally suitable.

The order in which the different elements of the dispersion are introduced is unimportant. The aqueous suspension, amphiphilic agent, organic phase and optional promoter agent may be mixed simultaneously. It is also possible to pre-mix the amphiphilic agent, organic phase and optional promoter agent.

Contact between the aqueous suspension or the precipitate and the organic phase can be made in a reactor which is in an atmosphere of air, nitrogen or an air-nitrogen mixture.

While contact between the aqueous suspension and the organic phase may be made at ambient temperature, about 20° C., it is preferable to operate at a temperature that is in the range from 60° C. to 150° C., advantageously between 80° C. and 140° C.

In certain cases, because of the volatility of the organic phase, its vapours may be condensed by cooling to a temperature below its boiling point.

The resulting reaction mixture (mixture of aqueous suspension, amphiphilic agent, organic phase and optional promoter agent) is stirred for the whole heating period, which can vary.

When heating is stopped, two phases are observed: an organic phase containing the colloidal dispersion, and a residual aqueous phase.

The organic phase and aqueous phase are then separated using conventional separation techniques: decantation, centrifuging.

In accordance with the present invention, organic colloidal dispersions are obtained which have the characteristics mentioned above.

The dispersions of the second implementation of the invention can be obtained by mixing a first colloidal dispersion of particles of a rare earth compound in an organic phase with a second colloidal dispersion of particles of an iron compound, said second dispersion being in accordance with the first implementation of the invention.

The first rare earth dispersion may be one as described in EP-A-0 206 907, EP-A-0 671 205 or WO-A-00/49098, for example.

Preferably, dispersions the organic phases of which are identical are mixed.

The organic colloidal dispersions which have just been described can be used as a gas oil additive for internal combustion engines, more particularly as an additive for diesel engine gas oils.

They can also be used as combustion additives in liquid fuel or motor fuel for energy generators such as internal combustion engines (ignition engines), domestic oil burners or reaction engines.

Finally, the invention concerns a motor fuel for internal combustion engines which contains a colloidal dispersion of the type described above or obtained by the process described above. This motor fuel is obtained by mixing it with the dispersion of the invention.

Examples will now be given.

EXAMPLE 1

Firstly, a solution of iron acetate was prepared.

412.2 g of 98% $Fe(NO_3)_3,5H_2O$ was introduced into a beaker and demineralized water was added to a volume of 2 litres. The solution was 0.5 M in Fe. 650 ml of 10% ammonia was added dropwise, with stirring and at ambient temperature to produce a pH of 7.

It was centrifuged for 10 min at 4500 rpm. The mother liquor was eliminated. It was taken up in suspension in water to a total volume of 2650 $cm^3$. It was stirred for 10 min. It was centrifuged for 10 min at 4500 rpm, then taken up into suspension in demineralized water to 2650 $cm^3$. It was stirred for 30 minutes. 206 ml of concentrated acetic acid was then added. It was left overnight with stirring. The solution was clear.

A solid was then precipitated in a continuous apparatus comprising:

a one litre reactor provided with a paddle agitator and an initial stock constituted by 500 $cm^3$ of demineralized water. This reaction volume was kept constant by overflow;

two supply flasks containing the iron acetate solution described above and a 10 M ammonium solution.

The iron acetate solution and the 10 M ammonia solution were added. The flow rates of the two solutions were fixed so that the pH was kept constant at 8.

The precipitate obtained was separated from the mother liquor by centrifuging at 4500 rpm for 10 min. 95.5 g of recovered hydrate, 21.5% dry extract (i.e. 20.0 g equivalent of $Fe_2O_3$ or 0.25 mole of Fe), was re-dispersed in a solution containing 42.7 g of isostearic acid and 141.8 g of ISOPAR L. The suspension was introduced into a jacketed reactor provided with a thermostatted bath and a stirrer. The reaction assembly was heated to 90° C. for 5h30.

After cooling, it was transferred into a test tube. Demixing was observed and 50 $cm^3$ of an aqueous phase and 220 $cm^3$ of an organic phase were recovered.

Completely discrete particles about 3 nm in diameter were observed by transmission electron cryo-microscopy.

X ray analysis of the dispersion showed that the particles were amorphous.

The dispersion underwent a heat treatment which comprised constant temperature stages at −20° C. and +80° C., cycling 6 times per day. After 6 months, no decantation was observed.

EXAMPLE 2

This example concerns an engine bench test employing the dispersion of the preceding example.

A Volkswagen 1.91 cylinder capacity turbo diesel engine with a manual gearbox, placed on a dynamometric rig was used. The exhaust line was provided with a 2.5 litre silicon carbide particle filter (IBIDEN 2000 cpsi, 5.66×6.00). The temperature of the exhaust gas was measured at the particle filter inlet using thermocouples. The pressure differential between the inlet and outlet of the particle filter was also measured.

The organic dispersion obtained in the preceding example was added to the fuel to provide a dose of 7 ppm of metal with respect to the supplemented fuel.

The particle filter was charged with particles under the following conditions:

rotation speed of engine: 2000 rpm;
torque 60 Nm;
inlet temperature of gas into filter: 250° C.;
charge duration: 8 hours The soot trapped in the particle filter was burned under the following conditions with an engine speed of 200 rpm, following a cycle comprising 8 stages of 15 minutes each as described below:

| Stage | Filter inlet temperature (° C.) | Torque (Nm) |
|---|---|---|
| 1 | 275 | 89 |
| 2 | 300 | 105 |
| 3 | 325 | 121 |
| 4 | 350 | 149 |
| 5 | 375 | 231 |
| 6 | 400 | 244 |
| 7 | 425 | 254 |
| 8 | 450 | 263 |

The pressure drop created by the particle filter initially increased because of the temperature increase then it reached a maximum before dropping because of combustion of the carbonaceous materials accumulated in the particle filter. The point (marked by its temperature) from which the pressure drop no longer increased was considered to represent the regeneration point of the particle filter by the additive.

During passage from stage 6 to stage 7, a reduction in the pressure drop was observed, which corresponded to combustion of soot in the filter. The combustion onset temperature was in the range 400° C. to 425° C. and more precisely, it was 405° C. Soot combustion caused a reduction in the drop at 425° C. of 6.49 mbar/min.

The results demonstrate a low regeneration temperature for a low concentration of additive in the fuel.

The invention claimed is:

1. A colloidal dispersion, comprising:
    an organic phase;
    particles of an iron compound in its amorphous form; consisting essentially of iron oxide, iron hydroxide, or iron oxyhydroxide, said particles presenting a $d_{50}$ of 1 nm to 5 nm; and
    at least amphiphilic agent.

2. The dispersion according to claim 1, wherein at least 90% of the iron compound particles are primary particles.

3. The dispersion according to claim 2, wherein at least 95% of the iron compound particles are primary particles.

4. The dispersion according to claim 2, wherein iron is essentially present in oxidation state 3.

5. The dispersion according to claim 1, wherein at least 85% of the iron compound particles are primary particles.

6. The dispersion according to claim 1, wherein the organic phase is based on an apolar hydrocarbon.

7. The dispersion according to claim 1 wherein the amphiphilic agent is a carboxylic acid containing 10 to 50 carbon atoms.

8. A motor fuel for internal combustion engines, comprising a colloidal dispersion as defined in claim 1.

9. The dispersion according to claim 1, wherein the particles have a $d_{50}$ in the range 3 nm to 4 nm.

10. A process for preparing a dispersion comprising:
    a) reacting in a reaction medium either an iron salt in the presence of an iron complexing agent or an iron complex with a base, maintaining the pH of the reaction medium at a value of at most 8 to obtain a precipitate, the iron complexing agent being selected from hydrosoluble carboxylic acids with a complexing constant K such that the pK is at least 3 and the iron complex being selected from the products of reacting iron salts with said acids; and
    adding to an organic phase in the presence of an amphiphilic agent, either:
    b1) the precipitate directly obtained from step a) and separated from the reaction medium;
    b2) the precipitate in suspension in the reaction medium; or
    b3) the precipitate directly obtained from reaction step a) separated from the reaction medium and taken up in aqueous suspension; and
    c) recovering from step b) said dispersion comprising particles consisting essentially of iron oxide, iron hydroxide or iron oxyhydroxide in an organic phase.

11. The process according to claim 10, wherein said carboxylic acid in step a) is a carboxylic acid, acid-alcohol, polyacid-alcohol, amino acid or polyacrylic acids.

12. The process according to claim 11, wherein the carboxylic acid is formic acid, acetic acid, tartaric acid or citric acid.

13. The process according to claim 10, wherein the pH of the reaction medium is kept at a value of at most 7.5.

14. The process according to claim 13, wherein the pH is in the range 6.5 to 7.5.

15. The process according to claim 10, further comprising the step of:
    d) separating and washing the precipitate recovered from step c).

16. The process according to claim 15, wherein the precipitate is further being matured at the end of step a).

* * * * *